United States Patent
Zhao et al.

(10) Patent No.: US 9,692,610 B2
(45) Date of Patent: Jun. 27, 2017

(54) METHOD AND RELATED DEVICE FOR INDICATING AND IDENTIFYING PHYSICAL RESOURCE BLOCK PRB

(71) Applicant: Huawei Technologies Co., Ltd., Shenzhen (CN)

(72) Inventors: Junhui Zhao, Shenzhen (CN); Qinghai Zeng, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 14/660,547

(22) Filed: Mar. 17, 2015

(65) Prior Publication Data

US 2015/0188719 A1 Jul. 2, 2015

Related U.S. Application Data

(63) Continuation of application No. PCT/CN2012/081497, filed on Sep. 17, 2012.

(51) Int. Cl.
| | |
|---|---|
| *H04H 20/71* | (2008.01) |
| *H04L 12/18* | (2006.01) |
| *H04W 72/00* | (2009.01) |
| *H04L 5/00* | (2006.01) |
| *H04W 72/04* | (2009.01) |

(52) U.S. Cl.
CPC .......... *H04L 12/189* (2013.01); *H04L 5/0053* (2013.01); *H04W 72/005* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2012/0213145 A1* | 8/2012 | Aminaka | ............. | H04B 7/2606 370/312 |
| 2012/0236776 A1* | 9/2012 | Zhang | ................... | H04W 48/12 370/312 |
| 2013/0294317 A1* | 11/2013 | Malladi | ................... | H04W 4/06 370/312 |
| 2013/0322363 A1* | 12/2013 | Chen | ................... | H04W 72/042 370/329 |

FOREIGN PATENT DOCUMENTS

| | | |
|---|---|---|
| CN | 101841772 | 9/2010 |
| CN | 101873527 A | 10/2010 |
| CN | 101998273 A | 3/2011 |
| WO | 2012011854 A2 | 1/2012 |

* cited by examiner

*Primary Examiner* — Chi H Pham
*Assistant Examiner* — Fahmida Chowdhury
(74) *Attorney, Agent, or Firm* — Slater Matsil, LLP

(57) ABSTRACT

Embodiments of the present invention disclose a method for indicating a physical resource block PRB, including: receiving indication information that is sent by a multi-cell multicast coordination entity MCE and used for indicating usage of a physical resource block PRB in a multimedia broadcast multicast service single frequency network MBSFN subframe; and sending the indication information for indicating the usage of the PRB in the MBSFN subframe to a served user terminal.

12 Claims, 9 Drawing Sheets

METHOD AND RELATED DEVICE FOR INDICATING AND IDENTIFYING PHYSICAL RESOURCE BLOCK PRB

This application is a continuation of International Application No. PCT/CN2012/081497, filed on Sep. 17, 2012, which is hereby incorporated by reference in its entirety.

TECHNICAL FIELD

The present invention relates to the field of communications technologies, and in particular, to a method and related device for indicating and identifying a physical resource block.

BACKGROUND

A multimedia broadcast multicast service (Multimedia Broadcast Multicast Service, MBMS) is one of important services developed by the 3rd Generation Partnership Project (3GPP). In the multimedia broadcast multicast service MBMS, a network side may simultaneously send same multimedia data to multiple mobile terminals in a network in a broadcast or multicast mode. In comparison with a single-user transmission mode, the MBMS greatly saves air interface resources in a system. In Long Term Evolution (Long Term Evolution, LTE), the multimedia broadcast multicast service MBMS is transmitted through a multimedia broadcast multicast service single frequency network (Multimedia Broadcast multicast service Single Frequency Network, MBSFN). This transmission mode is a transmission mode in which synchronous transmission is performed in multiple cells at a same time at a same frequency. This transmission mode can effectively save frequency resources, improve spectrum utilization, and improve coverage.

In the prior art, a multi-cell multicast coordination entity (Multi-cell multicast Coordination Entity, MCE) is a logical entity, which may be provided with multiple MBSFN areas (MBSFN Areas) for performing MBSFN transmission, and can allocate radio resources to all evolved base stations (evolved Node Bs, eNBs) in MBSFN areas performing multi-cell transmission, to perform MBSFN transmission. One MBSFN Area may include multiple eNBs, and content broadcast by all eNBs in a same MBSFN Area is the same and synchronous. At a same time, multiple services (services) may be broadcast in a same MBSFN Area, but services broadcast in different MBSFN Areas may be the same or may be different. With respect to cells, each cell may only belong to one MBSFN Area, or may belong to multiple MBSFN Areas at the same time.

In the prior art, an LTE MBMS only supports MBSFN transmission, but when an MBSFN subframe is also used for an enhanced control channel (enhanced Control Channel, eCCH), a user terminal cannot properly decode the MBMS and eCCH in a case in which the MBSFN subframe is multiplexed for the eCCH and the MBMS. The prior art cannot solve this problem, and there is no effective method for solving the problem in the prior art.

SUMMARY

Embodiments of the present invention provide a method for indicating a physical resource block PRB, to solve the problem that a user terminal cannot properly decode an MBMS and an eCCH in a case in which an MBSFN subframe is multiplexed for the eCCH and the MBMS.

According to a first aspect, a method for indicating a physical resource block PRB is provided, where the method includes: receiving indication information that is sent by a multi-cell multicast coordination entity MCE and used for indicating usage of a physical resource block PRB in a multimedia broadcast multicast service single frequency network MBSFN subframe; and sending the indication information for indicating the usage of the PRB in the MBSFN subframe to a served user terminal.

In a first possible implementation manner of the first aspect, the indication information used for indicating the usage of the PRB in the MBSFN subframe includes: indication information for indicating a PRB that are applied to an enhanced control channel eCCH in the MBSFN subframe.

With reference to the first possible implementation manner of the first aspect, in a second possible implementation manner of the first aspect the indication information used for indicating the usage of the PRB in the MBSFN subframe includes indication information for indicating a PRB that is not applied to multimedia broadcast multicast service MBMS transmission in the MBSFN subframe.

With reference to the second possible implementation manner of the first aspect, in a third possible implementation manner of the first aspect the indication information for indicating the PRB that is applied to the eCCH in the MBSFN subframe is used for indicating a quantity and/or position of the PRB that is applied to the eCCH in the MBSFN subframe; and the indication information for indicating the PRB that is not applied to MBMS transmission in the MBSFN subframe is used for indicating a quantity and/or position of the PRB that is not applied to MBMS transmission in the MBSFN subframe.

With reference to the first aspect or any one of the foregoing possible implementation manners of the first aspect, in a fourth possible implementation manner of the first aspect, the sending the indication information for indicating the usage of the PRB in the MBSFN subframe to a served user terminal includes: sending the indication information to the served user terminal by using broadcast signaling, where the indication information is used for indicating the usage of the PRB in the MBSFN subframe; or sending the indication information to the served user terminal by using broadcast signaling and dedicated signaling, where the indication information is used for indicating the usage of the PRB in the MBSFN subframe; or sending the indication information to the served user terminal by using dedicated signaling, where the indication information is used for indicating the usage of the PRB in the MBSFN subframe.

According to a second aspect, a method for identifying a physical resource block PRB is provided, where the method includes receiving indication information that is sent by a base station and used for indicating usage of a physical resource block PRB in a multimedia broadcast multicast service single frequency network MBSFN subframe; and identifying the usage of each PRB in the MBSFN subframe according to the received indication information used for indicating the usage of the PRB in the MBSFN subframe.

In a first possible implementation manner of the second aspect, the indication information that is sent by the base station and used for indicating the usage of the PRB in the MBSFN subframe includes indication information for indicating a PRB that is applied to an enhanced control channel eCCH in the MBSFN subframe, where the indication information for indicating the PRB that is applied to the eCCH in the MBSFN subframe is used for indicating a quantity and/or position of the PRB that is applied to the eCCH in the MBSFN subframe.

With reference to the first possible implementation manner of the second aspect, in a second possible implementation manner of the second aspect the indication information that is sent by the base station and used for indicating the usage of the PRB in the MBSFN subframe includes indication information for indicating a PRB that is not applied to MBMS transmission in the MBSFN subframe, where the indication information for indicating the PRB that is not applied to MBMS transmission in the MBSFN subframe is used for indicating a quantity and/or position of the PRB that is not applied to MBMS transmission in the MBSFN subframe.

According to a third aspect, an apparatus for indicating a physical resource block PRB is provided, where the apparatus includes a receiving unit, configured to receive indication information that is sent by a multi-cell multicast coordination entity MCE and used for indicating usage of a physical resource block PRB in a multimedia broadcast multicast service single frequency network MBSFN subframe; and a sending unit, configured to send the indication information for indicating the usage of the PRB in the MBSFN subframe to a served user terminal.

In a first possible implementation manner of the third aspect, the indication information that is received by the receiving unit and used for indicating the usage of the PRB in the MBSFN subframe includes indication information for indicating a PRB that is applied to an enhanced control channel eCCH in the MBSFN subframe; or indication information for indicating a PRB that is not applied to multimedia broadcast multicast service MBMS transmission in the MBSFN subframe, where the indication information for indicating the PRB that is applied to the eCCH in the MBSFN subframe is used for indicating a quantity and/or position of the PRB that is applied to the eCCH in the MBSFN subframe; and the indication information for indicating the PRB that is not applied to MBMS transmission in the MBSFN subframe is used for indicating a quantity and/or position of the PRB that is not applied to MBMS transmission in the MBSFN subframe.

With reference to the first possible implementation manner of the third aspect, in a second possible implementation manner of the third aspect, the sending unit is specifically configured to send the indication information for indicating the usage of the PRB in the MBSFN subframe to the served user terminal by using a multimedia broadcast multicast service control channel MCCH, a system message, or dedicated signaling.

According to a fourth aspect, a base station is provided, including a receiver, configured to receive indication information that is sent by a multi-cell multicast coordination entity MCE and used for indicating usage of a physical resource block PRB in a multimedia broadcast multicast service single frequency network MBSFN subframe; and a transmitter, configured to send the indication information for indicating the usage of the PRB in the MBSFN subframe to a served user terminal.

With reference to a first possible implementation manner of the fourth aspect, in a second possible implementation manner of the fourth aspect, the transmitter is specifically configured to send the indication information for indicating the usage of the PRB in the MBSFN subframe to the served user terminal by using a multimedia broadcast multicast service control channel MCCH, a system message, or dedicated signaling.

According to a fifth aspect, an apparatus for identifying a physical resource block PRB is provided, where the apparatus is applicable to a 4over6 mesh network and includes: a receiving unit, configured to receive indication information that is sent by a base station and used for indicating usage of a physical resource block PRB in a multimedia broadcast multicast service single frequency network MBSFN subframe; and an identifying unit, configured to identify the usage of each PRB in the MBSFN subframe according to the indication information that is received by the receiving unit and used for indicating the usage of the PRB in the MBSFN subframe.

In a first possible implementation manner of the fifth aspect, the indication information that is sent by the base station, received by the receiving unit, and used for indicating the usage of the PRB in the MBSFN subframe includes indication information for indicating a PRB that is applied to an eCCH in the MBSFN subframe; or indication information for indicating a PRB that is not applied to MBMS transmission in the MBSFN subframe, where the indication information for indicating the PRB that is applied to the eCCH in the MBSFN subframe is used for indicating a quantity and/or position of the PRB that is applied to the eCCH in the MBSFN subframe; and the indication information for indicating the PRB that is not applied to MBMS transmission in the MBSFN subframe is used for indicating a quantity and/or position of the PRB that is not applied to MBMS transmission in the MBSFN subframe.

According to a sixth aspect, a user terminal is provided, including a receiver, configured to receive indication information that is sent by a base station and used for indicating usage of a physical resource block PRB in a multimedia broadcast multicast service single frequency network MBSFN subframe; and a processor, configured to identify the usage of each PRB in the MBSFN subframe according to the indication information for indicating the usage of the PRB in the MBSFN subframe.

In a first possible implementation manner of the sixth aspect, the indication information that is sent by the base station, received by the receiver, and used for indicating the usage of the PRB in the MBSFN subframe includes indication information for indicating a physical resource block PRB that is applied to an enhanced control channel eCCH in the multimedia broadcast multicast service single frequency network MBSFN subframe; or indication information for indicating a PRB that is not applied to multimedia broadcast multicast service MBMS transmission in the MBSFN subframe, where the indication information for indicating the PRB that is applied to the eCCH in the MBSFN subframe is used for indicating a quantity and/or position of the PRB that is applied to the eCCH in the MBSFN subframe; and the indication information for indicating the PRB that is not applied to MBMS transmission in the MBSFN subframe is used for indicating a quantity and/or position of the PRB that is not applied to MBMS transmission in the MBSFN subframe.

By using the technical solutions provided by the embodiments of the present invention, when some PRBs in an MBSFN subframe are applied to an eCCH, the problem that a user terminal cannot properly decode an MBMS and the eCCH in a case in which the MBSFN subframe is multiplexed for the eCCH and the MBMS can be solved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
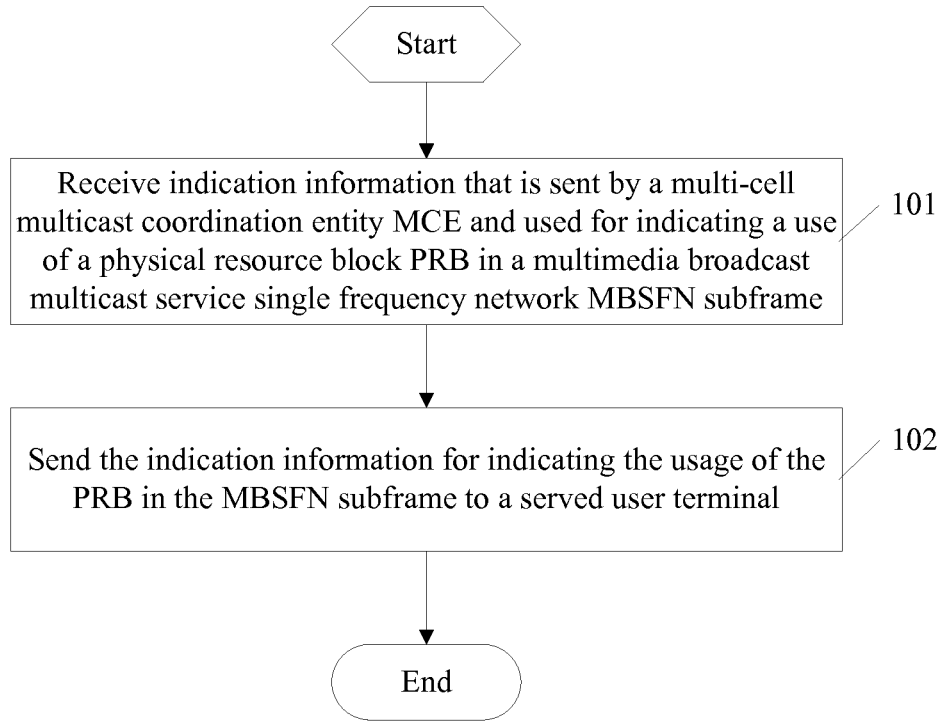
FIG. 1 is a schematic flowchart of a method for indicating a physical resource block PRB according to the present invention.

Referring to FIG. 1, an embodiment of the present invention provides a method for indicating a physical resource block PRB, where the method includes the following steps.

101. Receive indication information that is sent by a multi-cell multicast coordination entity MCE and used for indicating usage of a physical resource block PRB in a multimedia broadcast multicast service single frequency network MBSFN subframe.

Specifically, a base station receives indication information that is notified by an MCE by using M2 interface signaling and used for indicating usage of a PRB in an MBSFN subframe, where the M2 interface is an interface between the MCE and the eNB.

102. Send the indication information for indicating the usage of the PRB in the MBSFN subframe to a served user terminal.

Specifically, after receiving the indication information that is sent by the MCE and used for indicating the usage of the PRB in the MBSFN subframe, the base station sends the indication information for indicating the usage of the PRB in the MBSFN subframe to the served user terminal, where the indication information used for indicating the usage of the PRB in the MBSFN subframe includes: indication information for indicating a PRB that is applied to an eCCH in the MBSFN subframe; where the indication information for indicating the PRB that is applied to the eCCH in the MBSFN subframe is used for indicating a quantity and/or position of the PRB that is applied to the eCCH in the MBSFN subframe; or indication information for indicating a PRB that is not applied to MBMS transmission in the MBSFN subframe. The indication information for indicating the PRB that is not applied to MBMS transmission in the MBSFN subframe is used for indicating a quantity and/or position of the PRB that is not applied to MBMS transmission in the MBSFN subframe.

The sending the indication information for indicating the usage of the PRB in the MBSFN subframe to a served user terminal in step 102 includes: sending the indication information to the served user terminal by using broadcast signaling, where the indication information is used for indicating the usage of the PRB in the MBSFN subframe; or sending the indication information to the served user terminal by using broadcast signaling and dedicated signaling, where the indication information is used for indicating the usage of the PRB in the MBSFN subframe; or sending the indication information to the served user terminal by using dedicated signaling, where the indication information is used for indicating the usage of the PRB in the MBSFN subframe.

In this embodiment, after a base station receives indication information that is sent by an MCE and used for indicating usage of a PRB in an MBSFN subframe, the base station sends the indication information for indicating the usage of the PRB in the MBSFN subframe to a served user terminal, so that the user terminal properly decodes an MBMS and an eCCH according to the received indication information.

Figure 2:
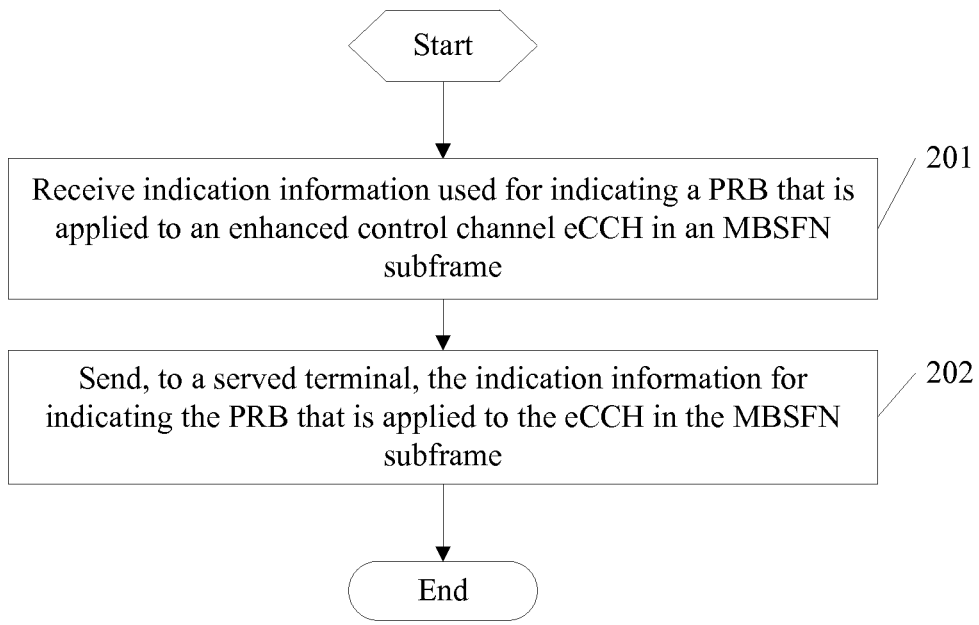
FIG. 2 is a schematic flowchart of a first implementation manner of the method for indicating a physical resource block PRB shown in FIG. 1.

Referring to FIG. 2, in a first specific implementation manner of the method for indicating a physical resource block PRB according to the present invention, the method includes the following steps.

201. Receive indication information used for indicating a PRB that is applied to an eCCH in an MBSFN subframe.

Specifically, when indication information that is sent by an MCE, received by a base station, and used for indicating usage of a PRB in an MBSFN subframe indicates PRB that is applied to an eCCH in the MBSFN subframe, the base station sends, to a served user terminal by using a multimedia broadcast multicast service control channel (MBMS Control Channel, MCCH) or a system message SIB13, the indication information for indicating the PRB that is applied to the eCCH in the MBSFN subframe, where the indication information for indicating the PRB that is applied to the eCCH in the MBSFN subframe is used for indicating a quantity and/or position of the PRB that is applied to the eCCH in the MBSFN subframe.

202. Send, to a served user terminal, the indication information for indicating the PRB that is applied to the eCCH in the MBSFN subframe.

Specifically, generally all PRBs in the MBSFN subframe are used for sending an MBMS by default; however, when the base station receives the indication information used for indicating the PRB that is applied to the eCCH in the MBSFN subframe, the base station sends, to the user terminal by using broadcast signaling MCCH or SIB13, the indication information for indicating the PRB that is applied to the eCCH in the MBSFN subframe, so that the user terminal decodes, according to the MCCH or SIB13 information broadcast by the base station, the eCCH in the indication information for indicating the PRB that is applied to the eCCH in the MBSFN subframe. Meanwhile, the user terminal reads, according to the MCCH or SIB13 information broadcast by the base station, MBMS data in a PRB different from the PRB that is applied to the eCCH in the MBSFN subframe.

For example, the indication information used for indicating the PRB that is applied to the eCCH in the MBSFN subframe, which is mentioned in the method of this embodiment, may be a bit stream, where an $n^{th}$ bit corresponds to an $n^{th}$ PRB in the MBSFN subframe, 1 indicates that the PRB is applied to the eCCH (that is, not applied to MBMS transmission), and 0 indicates that the PRB is not applied to the eCCH (that is, applied to MBMS transmission); or conversely, 0 indicates that the PRB is applied to the eCCH (that is, not applied to MBMS transmission), and 1 indicates that the PRB is not applied to the eCCH (that is, applied to MBMS transmission). A quantity of is or Os in the bit stream implicitly indicates a quantity of the PRB that is applied to the eCCH, or may directly be a quantity of the PRB that is applied to the eCCH.

It should be noted that, in this embodiment, quantities or positions of PRBs applied to an eCCH in all base stations in a same MBSFN Area are the same.

Figure 3:
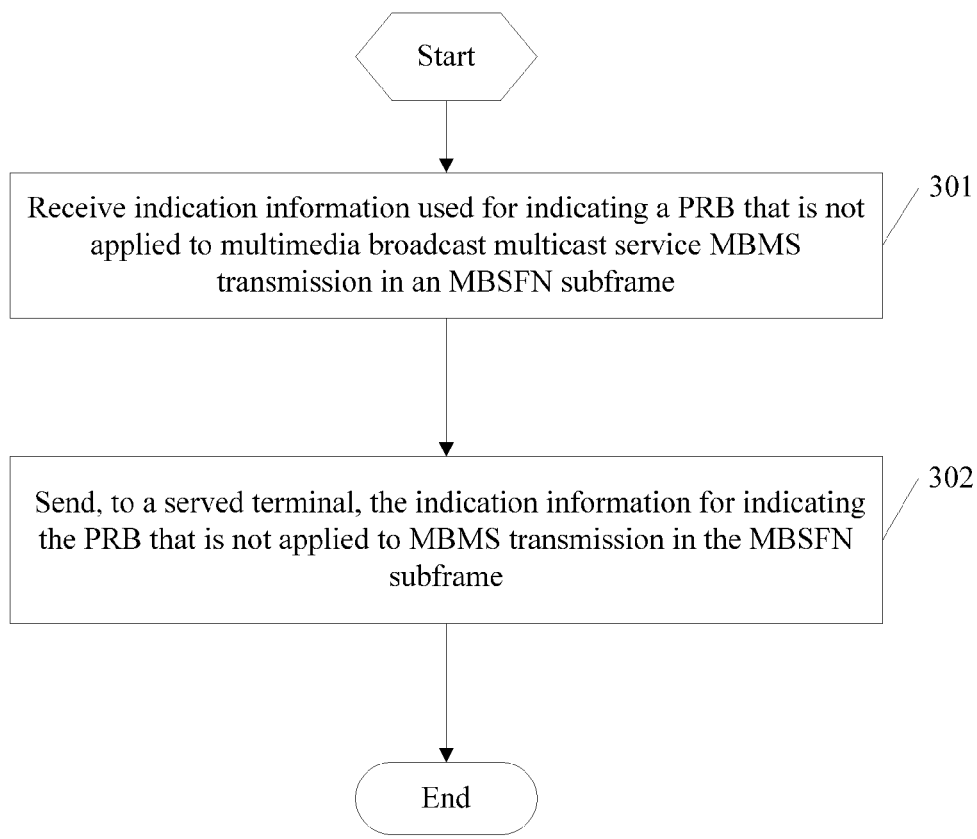
FIG. 3 is a schematic flowchart of a second implementation manner of the method for indicating a physical resource block PRB shown in FIG. 1.

Referring to FIG. 3, in a second specific implementation manner of the method for indicating a physical resource block PRB according to the present invention, the method includes the following steps.

301. Receive indication information used for indicating a PRB that is not applied to MBMS transmission in an MBSFN subframe.

Specifically, when indication information that is received by a base station and used for indicating usage of a PRB in an MBSFN subframe indicates PRB that is not applied to MBMS transmission in the MBSFN subframe, the base station sends, to a served user terminal by using broadcast signaling MCCH or SIB13, the indication information for indicating the PRB that is not applied to MBMS transmission in the MBSFN subframe, where the indication information for indicating the PRB that is not applied to MBMS transmission in the MBSFN subframe is used for indicating a quantity and/or position of the PRB that is not applied to MBMS transmission in the MBSFN subframe.

Further, when the indication information that is received by the base station and used for indicating the usage of the PRB in the MBSFN subframe indicates the PRB that is not applied to MBMS transmission in the MBSFN subframe, because the PRB that is not applied to MBMS transmission in the MBSFN subframe may be applied to an eCCH or may be used for other purposes, they are a parent set of all PRBs that may be applied to the eCCH in the MBSFN subframe in a related MBSFN area. For a specific user terminal, the PRB that is applied to the eCCH may be a subset of the parent set. Therefore, while the base station sends, to the user terminal by using the broadcast signaling MCCH or SIB13, the indication information for indicating the PRB that is not applied to MBMS transmission in the MBSFN subframe, the base station further sends, to a specific user terminal by using dedicated signaling such as Radio Resource Control protocol (Radio Resource Control, RRC) signaling, indication information for indicating the PRB that is applied to the eCCH in the MBSFN subframe, so that the specific user terminal reads the eCCH in the PRB indicated by the dedicated signaling.

Optionally, when the indication information that is received by the base station and used for indicating the usage of the PRB in the MBSFN subframe indicates the PRB that is not applied to MBMS transmission in the MBSFN subframe, the base station may also directly notify, by using dedicated signaling such as RRC signaling, the user terminal of the indication information for indicating the PRB that is applied to the eCCH for the user terminal, where the indication information includes a quantity and/or position of the PRB that is applied to the eCCH in the MBSFN subframe, so that the user terminal reads the eCCH in the PRB indicated by the dedicated signaling and reads an MBMS in a PRB that is different from the foregoing PRB in the MBSFN subframe.

It should be noted that, when the indication information that is received by the base station and used for indicating the PRB that is not applied to MBMS transmission in the MBSFN subframe indicates the PRB that may be applied to the eCCH, the indication information is used for indicating a quantity and/or position of the PRB that may be applied to the eCCH in the MBSFN subframe. The PRB that may be applied to the eCCH in the MBSFN subframe are a parent set of all the PRBs that may be applied to the eCCH in the MBSFN subframe in the related MBSFN area. For a specific user terminal, the PRB that is applied to the eCCH may be a subset of the parent set. Therefore, while the base station sends, to the user terminal by using the broadcast signaling MCCH or SIB13, the indication information for indicating the PRB that may be applied to the eCCH in the MBSFN subframe, the base station further sends, to a specific user terminal by using dedicated signaling such as RRC signaling, the indication information for indicating the PRB that is applied to the eCCH in the MBSFN subframe.

Optionally, when the indication information that is received by the base station and used for indicating the PRB that is not applied to MBMS transmission in the MBSFN subframe indicates the PRB that may be applied to the eCCH, the base station may also directly notify, by using dedicated signaling such as RRC signaling, the user terminal of the indication information for indicating the PRB that is applied to the eCCH for the user terminal, where the indication information includes a quantity and/or position of the PRB that is applied to the eCCH in the MBSFN subframe, so that the user terminal reads the eCCH in the PRB indicated by the dedicated signaling and reads the MBMS in a PRB that is different from the foregoing PRB in the MBSFN subframe.

302. Send, to a served user terminal, the indication information for indicating the PRB that is not applied to MBMS transmission in the MBSFN subframe.

Specifically, generally all PRBs in the MBSFN subframe are used for sending an MBMS by default; however, when the base station receives the indication information used for indicating the PRB that is not applied to MBMS transmission in the MBSFN subframe, the base station sends, to the user terminal by using broadcast signaling MCCH or SIB13, the indication information for indicating the PRB that is not applied to MBMS transmission in the MBSFN subframe, so that the user terminal reads, according to the MCCH or SIB13 information broadcast by the base station, the MBMS in a PRB that is different from the foregoing PRB in the MBSFN subframe.

When the base station receives the indication information that is sent by an MCE and used for indicating the PRB that is not applied to MBMS transmission in the MBSFN subframe, the base station determines by itself, in a scope of PRB that is not applied to MBMS transmission in the MBSFN subframe, which PRB is applied to the eCCH for a specific user terminal, and sends, to the served user terminal, the indication information for indicating the PRB that is applied to the eCCH in the MBSFN subframe, where the indication information for indicating the PRB that is applied to the eCCH in the MBSFN subframe is used for indicating a quantity and/or position of the PRB that is applied to the eCCH in the MBSFN subframe.

Further, while the base station sends, to the user terminal by using broadcast signaling MCCH or SIB13, the indication information for indicating the PRB that is not applied to MBMS transmission in the MBSFN subframe, the base station further sends, to the user terminal by using dedicated signaling such as RRC signaling, the indication information for indicating the PRB that is applied to the eCCH in the MBSFN subframe, so that the user terminal reads the eCCH in the PRB indicated by the dedicated signaling.

Optionally, when the base station receives the indication information used for indicating the PRB that is not applied to MBMS transmission in the MBSFN subframe, the base station may also directly send, to the user terminal by using dedicated signaling such as RRC signaling, the indication information for indicating the PRB that is applied to the eCCH in the MBSFN subframe, so that the user terminal reads the eCCH in the PRB indicated by the dedicated signaling. Meanwhile, the user terminal further reads the MBMS in a PRB that is different from the foregoing PRB in the MBSFN subframe.

For example, the indication information used for indicating the PRB that is not applied to MBMS transmission in the MBSFN subframe, which is mentioned in the method of this embodiment, may be a bit stream, where an $n^{th}$ bit corresponds to an $n^{th}$ PRB in the MBSFN subframe, 1 indicates that the PRB is applied to MBMS transmission (that is, not applied to the eCCH), and 0 indicates that the PRB is not applied to MBMS transmission (that is, applied to the eCHH); or conversely, 0 indicates that the PRB is applied to MBMS transmission (that is, not applied to the eCCH), and 1 indicates that the PRB is not applied to MBMS transmission (that is, applied to the eCCH). A quantity of is or Os in the bit stream implicitly indicates a quantity of the PRB that is applied to MBMS transmission, or may directly be a quantity of the PRB that is applied to the eCCH.

It should be noted that, when the indication information that is received by the base station and used for indicating the PRB that is not applied to MBMS transmission in the MBSFN subframe is the indication information for indicating the PRB that may be applied to the eCCH, the base station sends, to the user terminal by using broadcast signaling MCCH or SIB13, the indication information for indicating the PRB that may be applied to the eCCH in the MBSFN subframe, so that the user terminal reads, according to the information broadcast by the base station, the MBMS in a PRB that is different from the foregoing PRB in the MBSFN subframe. Meanwhile, the base station further sends, to the user terminal by using dedicated signaling such as RRC signaling, the indication information for indicating the PRB that is applied to the eCCH in the MBSFN subframe, so that the user terminal reads the eCCH in the PRB indicated by the dedicated signaling.

Optionally, when the indication information that is received by the base station and used for indicating the PRB that is not applied to MBMS transmission in the MBSFN subframe indicates the PRB that may be applied to the eCCH, the base station may also directly notify, by using dedicated signaling such as RRC signaling, the user terminal of the indication information for indicating the PRB that is applied to the eCCH for the user terminal, so that the user terminal reads the eCCH in the PRB indicated by the dedicated signaling and reads the MBMS in a PRB that is different from the foregoing PRB in the MBSFN subframe.

Figure 4:
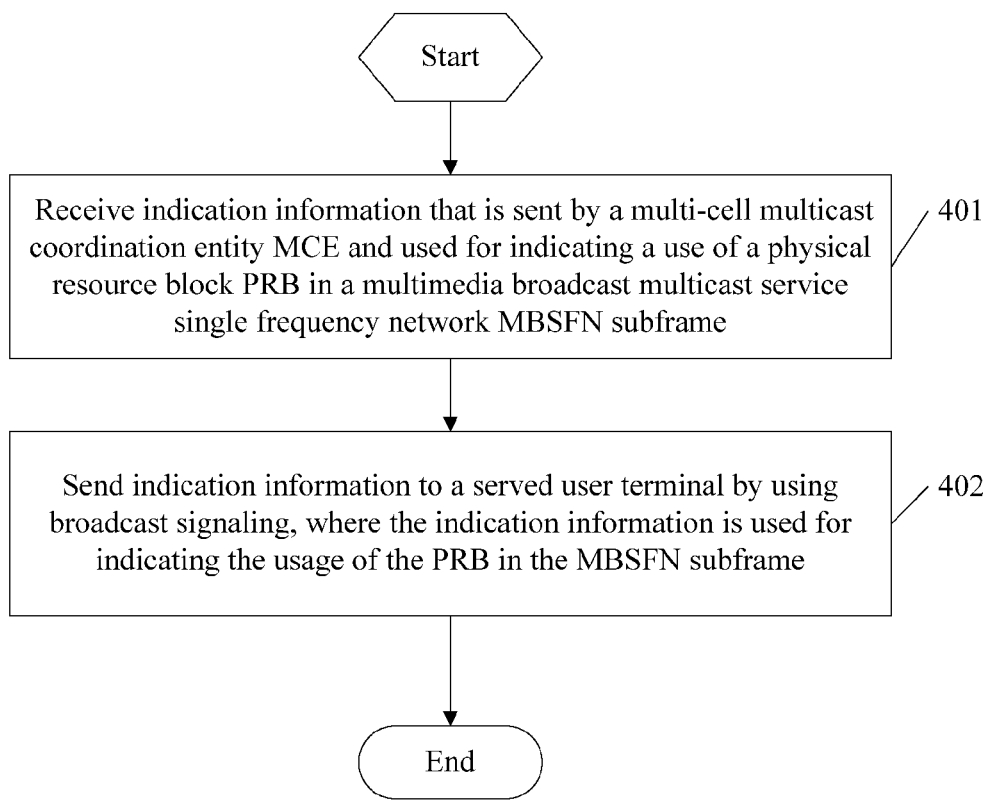
FIG. 4 is a schematic flowchart of a third implementation manner of the method for indicating a physical resource block PRB shown in FIG. 1.

Referring to FIG. 4, in a third specific implementation manner of the method for indicating a physical resource block PRB according to the present invention, the method includes the following steps.

401. Receive indication information used for indicating usage of a PRB in an MBSFN subframe.

402. Send indication information to a served user terminal by using broadcast signaling, where the indication information is used for indicating the usage of the PRB in the MBSFN subframe.

Specifically, when a base station receives indication information used for indicating a PRB that is applied to an eCCH in an MBSFN subframe, the base station sends, to a user terminal by using broadcast signaling MCCH or SIB13, the indication information for indicating the PRB that is applied to the eCCH in the MBSFN subframe, so that the user terminal decodes, according to the broadcast MCCH or SIB13 information, the eCCH in the PRB that is applied to the eCCH in the MBSFN subframe. Meanwhile, the user terminal reads, according to the MCCH or SIB13 information broadcast by the eNB, MBMS data in a PRB different from the PRB that is applied to the eCCH in the MBSFN subframe.

Optionally, when the indication information that is received by the base station and used for indicating the usage of the PRB in the MBSFN subframe indicates PRB that is not applied to MBMS transmission in the MBSFN subframe, the base station sends, to a served user terminal by using broadcast signaling MCCH or SIB13, indication information for indicating the PRB that is not applied to MBMS transmission in the MBSFN subframe, where the indication information for indicating the PRB that is not applied to MBMS transmission in the MBSFN subframe is used for indicating a quantity and/or position of the PRB that is not applied to MBMS transmission in the MBSFN subframe.

Figure 5:
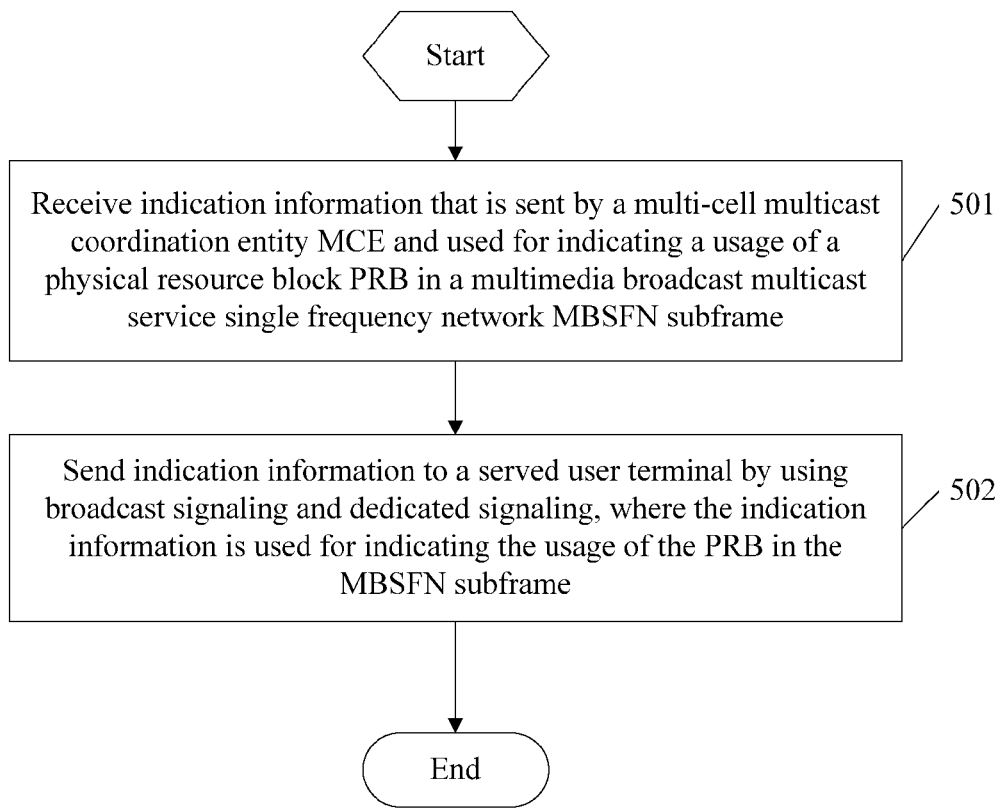
FIG. 5 is a schematic flowchart of a fourth implementation manner of the method for indicating a physical resource block PRB shown in FIG. 1.

Referring to FIG. 5, in a fourth specific implementation manner of the method for indicating a physical resource block PRB according to the present invention, the method includes the following steps.

501. Receive indication information used for indicating usage of a PRB in an MBSFN subframe.

502. Send notification information to a served user terminal by using broadcast signaling and dedicated signaling, where the notification information includes the indication information for indicating the usage of the PRB in the MBSFN subframe.

Specifically, when indication information that is received by a base station and used for indicating usage of a PRB in an MBSFN subframe indicates PRB that is not applied to MBMS transmission in the MBSFN subframe, the base station sends, to a user terminal by using broadcast signaling MCCH or SIB13, the indication information for indicating the PRB that is not applied to MBMS transmission in the MBSFN subframe, so that the user terminal reads, according to the MCCH or SIB13 information broadcast by the base station, an MBMS in a PRB that is different from the foregoing PRB in the MBSFN subframe. Meanwhile, the base station further sends, to the user terminal by using dedicated signaling such as RRC signaling, indication information for indicating a PRB that is applied to an eCCH in the MBSFN subframe, so that the user terminal reads the eCCH in the PRB indicated by the dedicated signaling.

Further, when the indication information that is received by the base station and used for indicating the PRB that is not applied to MBMS transmission in the MBSFN subframe is indication information for indicating a PRB that may be applied to the eCCH, the base station sends, to the user terminal by using broadcast signaling MCCH or SIB13, the indication information for indicating the PRB that may be applied to the eCCH in the MBSFN subframe, and sends, to a specific user terminal by using dedicated signaling such as RRC signaling, the indication information for indicating the PRB that is applied to the eCCH in the MBSFN subframe.

Figure 6:
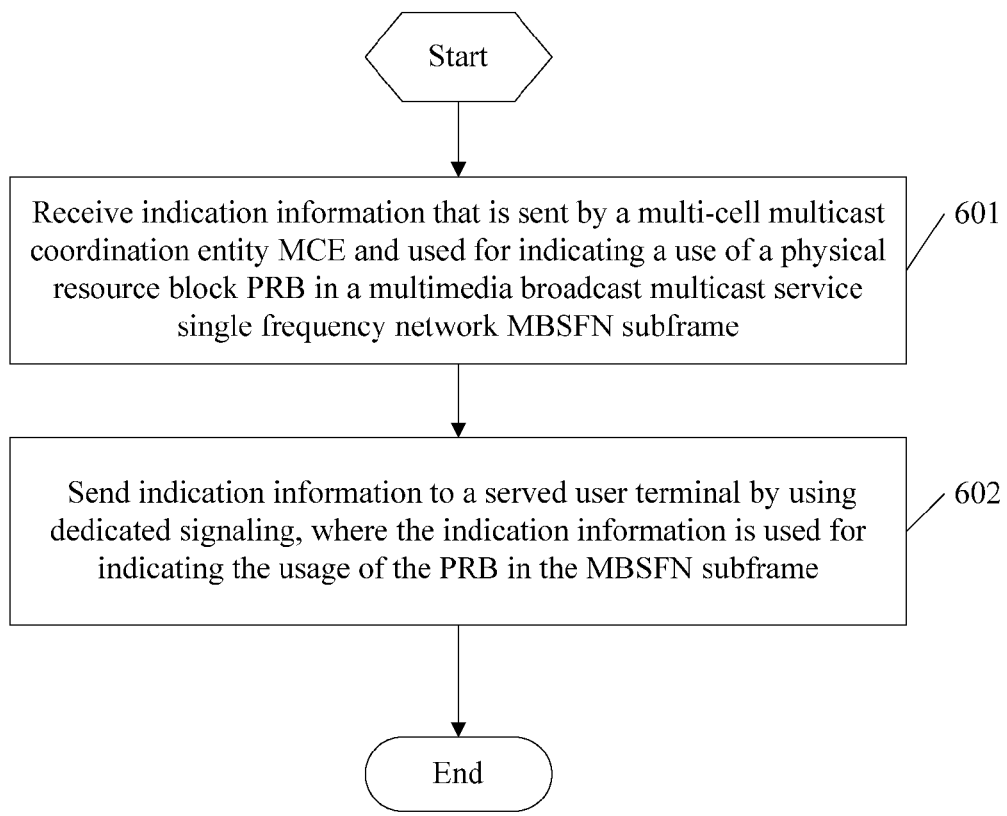
FIG. 6 is a schematic flowchart of a fifth implementation manner of the method for indicating a physical resource block PRB shown in FIG. 1.

Referring to FIG. 6, in a fifth specific implementation manner of the method for indicating a physical resource block PRB according to the present invention, the method includes the following steps.

601. Receive indication information used for indicating usage of a PRB in an MBSFN subframe.

602. Send notification information to a served user terminal by using dedicated signaling, where the notification information includes the indication information for indicating the usage of the PRB in the MBSFN subframe.

Specifically, when indication information that is received by a base station and used for indicating usage of a PRB in an MBSFN subframe indicates PRB that is not applied to MBMS transmission in the MBSFN subframe, the base station may also directly send, to a user terminal by using dedicated signaling such as RRC signaling, indication information for indicating a PRB that is applied to a eCCH in the MBSFN subframe, so that the user terminal reads the eCCH in the PRB indicated by the dedicated signaling, where the PRB that is not applied to MBMS transmission in the MBSFN subframe may be applied to the eCCH or may be used for other purposes.

Optionally, when the indication information that is received by the base station and used for indicating the PRB that is not applied to MBMS transmission in the MBSFN subframe is indication information for indicating a PRB that may be applied to the eCCH, the base station may also directly notify, by using dedicated signaling such as RRC signaling, the user terminal of the indication information for indicating the PRB that is applied to the eCCH for the user terminal, where the indication information includes a quantity and/or position of the PRB that is applied to the eCCH in the MBSFN subframe, so that the user terminal reads the eCCH in the PRB indicated by the dedicated signaling and reads an MBMS in a PRB that is different from the foregoing PRB in the MBSFN subframe.

As can be seen, by using the method for indicating a physical resource block PRB according to this embodiment of the present invention, when an MBSFN subframe is multiplexed for an eCCH and an MBMS, when a base station receives indication information that is sent by an MCE and used for indicating usage of a PRB in the MBSFN subframe, the base station sends, to a served user terminal by using broadcast signaling and/or dedicated signaling, the indication information for indicating the usage of the PRB in the MBSFN subframe, so that the user terminal can properly decode the MBMS and eCCH.

Figure 7:
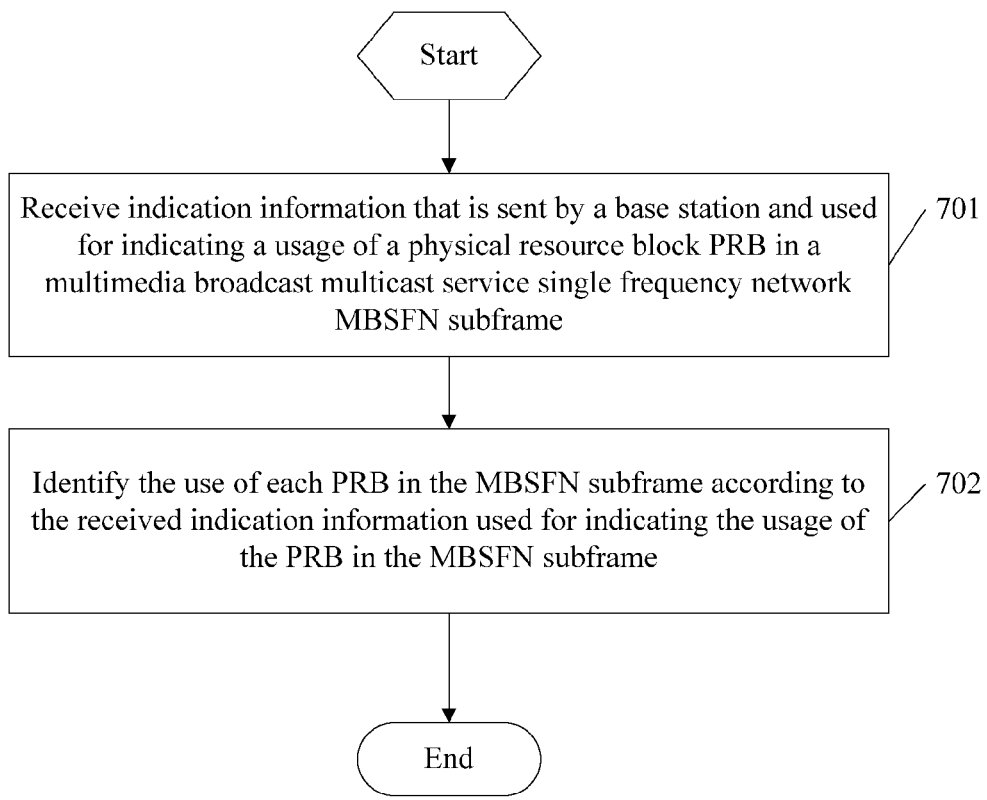
FIG. 7 is a schematic flowchart of a method for identifying a physical resource block PRB according to the present invention.

Referring to FIG. 7, the present invention provides a method for identifying a physical resource block PRB, where the method includes the following steps.

701. Receive indication information that is sent by a base station and used for indicating usage of a PRB in an MBSFN subframe.

Specifically, the indication information that is sent by the base station, received by a user terminal, and used for indicating the usage of the PRB in the MBSFN subframe is notified by the base station by using broadcast and/or dedicated signaling.

702. Identify the usage of each PRB in the MBSFN subframe according to the received indication information used for indicating the usage of the PRB in the MBSFN subframe.

Specifically, the indication information that is sent by the base station and used for indicating the usage of the PRB in the MBSFN subframe includes indication information for indicating a PRB that is applied to an eCCH in the MBSFN subframe, where the indication information for indicating the PRB that is applied to the eCCH in the MBSFN subframe is used for indicating a quantity and/or position of the PRB that is applied to the eCCH in the MBSFN subframe; or indication information for indicating a PRB that is not applied to MBMS transmission in the MBSFN subframe, where the indication information for indicating the PRB that is not applied to MBMS transmission in the MBSFN subframe is used for indicating a quantity and/or position of the PRB that is not applied to MBMS transmission in the MBSFN subframe.

In this embodiment, when a user terminal receives indication information that is sent by a base station and used for indicating usage of a PRB in an MBSFN subframe, the user terminal identifies the usage of each PRB in the MBSFN subframe according to the received indication information used for indicating the usage of the PRB in the MBSFN subframe, so that the user terminal can properly decode an MBMS and an eCCH in a case in which the MBSFN subframe is multiplexed for the eCCH and the MBMS.

Figure 8:
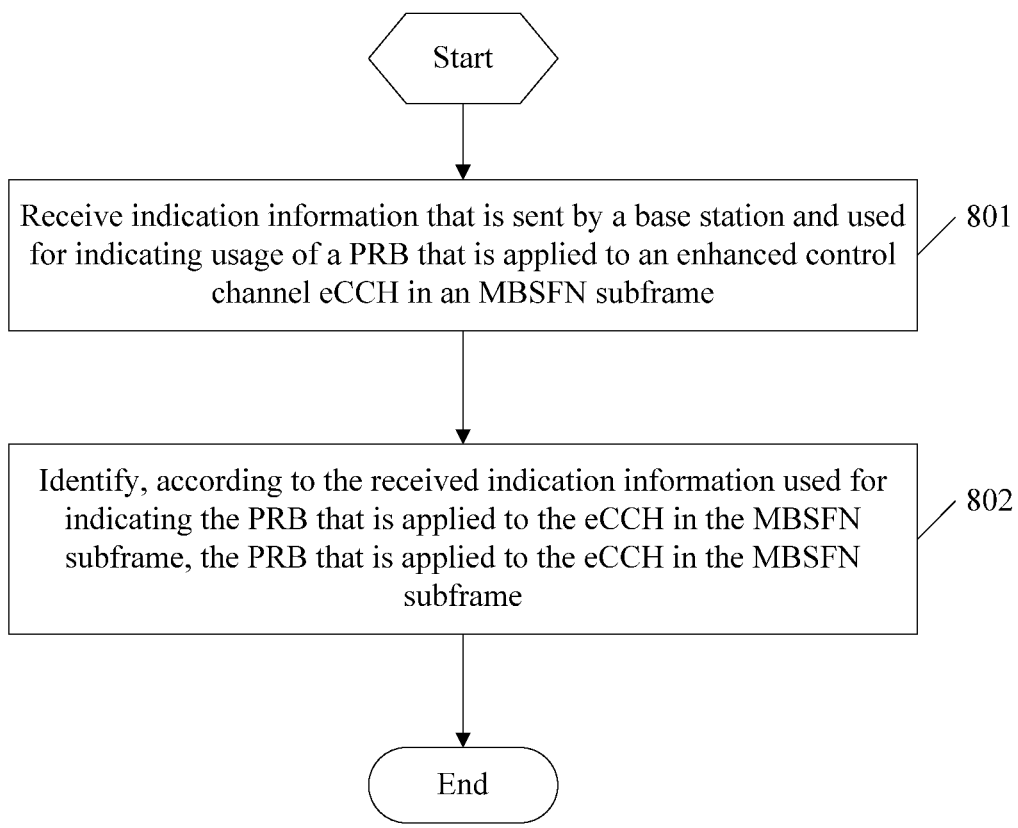
FIG. 8 is a schematic flowchart of a first implementation manner of the method for identifying a physical resource block PRB shown in FIG. 7.

Referring to FIG. 8, in a first specific implementation manner of the method for identifying a physical resource block PRB according to the present invention, the method includes the following steps.

801. Receive indication information that is sent by a base station and used for indicating a PRB that is applied to an eCCH in an MBSFN subframe.

Specifically, when a user terminal receives indication information that is sent by a base station by using broadcast signaling MCCH or SIB13 and used for indicating a PRB that is applied to an eCCH in an MBSFN subframe, the user terminal identifies, according to the MCCH or SIB13 information broadcast by the base station, the indication information for indicating the PRB that is applied to the eCCH in the MBSFN subframe. The indication information for indicating the PRB that is applied to the eCCH in the MBSFN subframe is used for indicating a quantity and/or position of the PRB that is applied to the eCCH in the MBSFN subframe.

802. Identify, according to the received indication information used for indicating the PRB that is applied to the eCCH in the MBSFN subframe, the PRB that is applied to the eCCH in the MBSFN subframe.

Specifically, the user terminal identifies, according to the MCCH or SIB13 information broadcast by the base station, the indication information for indicating the PRB that is applied to the eCCH in the MBSFN subframe, and determines a quantity and/or position of the PRB that is applied to the eCCH in the MBSFN subframe. That is, the user terminal reads, according to the MCCH or SIB13 information broadcast by the base station, an MBMS in a PRB different from the PRB that is applied to the eCCH in the MBSFN subframe. Meanwhile, the user terminal decodes, according to the MCCH or SIB13 information broadcast by the base station, the eCCH in the PRB that is applied to the eCCH in the MBSFN subframe.

For example, a quantity and/or position of the PRB that is applied to the eCCH in the MBSFN subframe may be a bit stream, where an $n^{th}$ bit corresponds to an $n^{th}$ PRB in the MBSFN subframe, 1 indicates that the PRB is applied to the eCCH (that is, not applied to MBMS transmission), and 0 indicates that the PRB is not applied to the PRB (that is, applied to MBMS transmission); or conversely, 0 indicates that the PRB is applied to the eCCH (that is, not applied to MBMS transmission), and 1 indicates that the PRB is not applied to the eCCH (that is, applied to MBMS transmission). A quantity of is or Os in the bit stream implicitly indicates a quantity of the PRB that is applied to the eCCH, so that the user terminal can properly decode the MBMS and eCCH in a case in which the MBSFN subframe is multiplexed for the eCCH and the MBMS.

Figure 9:
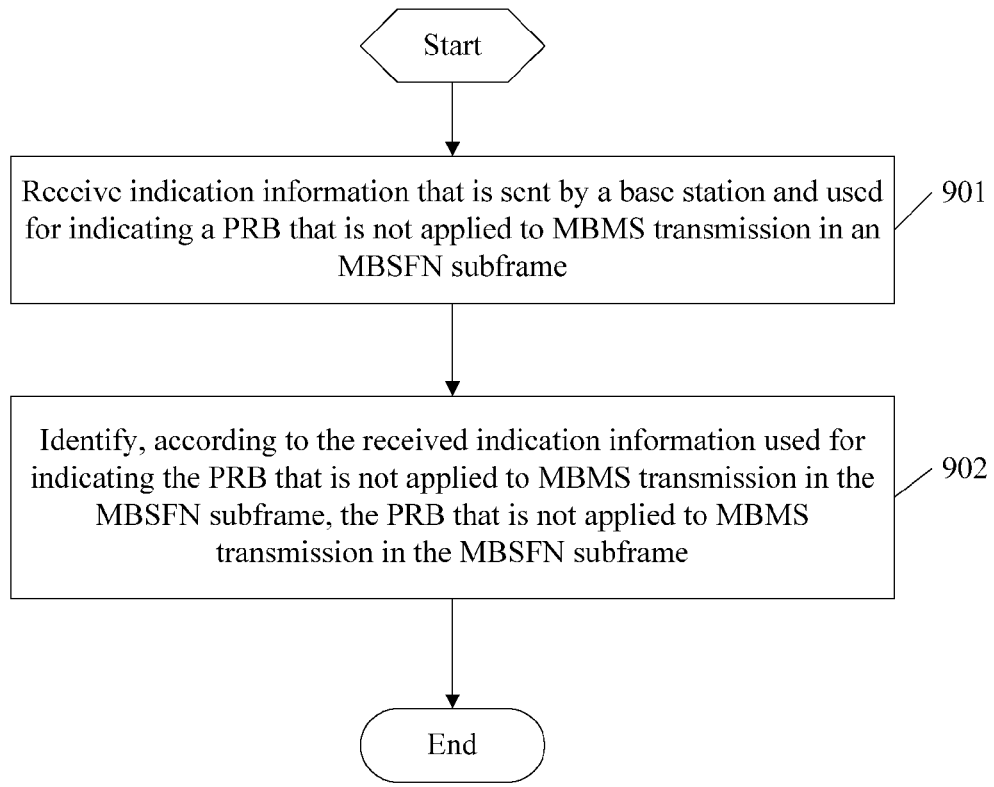
FIG. 9 is a schematic flowchart of a second implementation manner of the method for identifying a physical resource block PRB shown in FIG. 7.

Referring to FIG. 9, in a second specific implementation manner of the method for identifying a physical resource block PRB according to the present invention, the method includes the following steps.

901. Receive indication information that is sent by a base station and used for indicating a PRB that is not applied to MBMS transmission in an MBSFN subframe.

Specifically, a user terminal receives indication information that is sent by a base station by using broadcast signaling MCCH or SIB13 and used for indicating a PRB that is not applied to MBMS transmission in an MBSFN subframe, where the indication information for indicating the PRB that is not applied to MBMS transmission in the MBSFN subframe is used for indicating a quantity and/or position of the PRB that is not applied to MBMS transmission in the MBSFN subframe.

In this embodiment, the PRB that is not applied to MBMS transmission in the MBSFN subframe may be applied to an eCCH or may be used for other purposes. They are a parent set of all PRBs that may be applied to the eCCH in the MBSFN subframe in a related MBSFN area. For a specific user terminal, the PRB that is applied to the eCCH may be a subset of the parent set.

902. Identify, according to the received indication information used for indicating the PRB that is not applied to MBMS transmission in the MBSFN subframe, the PRB that is not applied to MBMS transmission in the MBSFN subframe.

Specifically, the user terminal identifies, according to the MCCH or SIB13 information broadcast by the base station, the indication information for indicating the PRB that is not applied to MBMS transmission in the MBSFN subframe, that is, reads, according to the MCCH or SIB13 information broadcast by the base station, MBMS data in a PRB that is different from the foregoing PRB in the MBSFN subframe.

Further, while the user terminal identifies, from the MCCH or SIB13 information broadcast by the base station, the indication information for indicating the PRB that is not applied to MBMS transmission in the MBSFN subframe, the user terminal receives indication information that is sent by the base station by using dedicated signaling such as RRC signaling and used for indicating the PRB that is applied to the eCCH in the MBSFN subframe, and reads the eCCH in the PRB indicated by the dedicated signaling.

Optionally, when the user terminal receives the indication information that is sent by the base station by using dedicated signaling and used for indicating the PRB that is applied to the eCCH in the MBSFN subframe, the user terminal may also directly read the eCCH in the PRB indicated by the dedicated signaling, and reads an MBMS in a PRB that is different from the foregoing PRB in the MBSFN subframe.

It should be noted that, when the indication information that is received from the base station and used for indicating the PRB that is not applied to MBMS transmission in the MBSFN subframe indicates the PRB that may be applied to the eCCH, the user terminal identifies, according to the MCCH or SIB13 information broadcast by the eNB, indication information for indicating all the PRBs that may be applied to the eCCH in the MBSFN subframe. However, a specific user terminal may identify, according to dedicated signaling of the base station, the indication information for indicating the PRB that is applied to the eCCH in the MBSFN subframe.

Optionally, when the indication information that is received from the base station and used for indicating the PRB that is not applied to MBMS transmission in the MBSFN subframe indicates the PRB that may be applied to the eCCH, the user terminal reads, according to the indication information that is sent directly by the base station by using dedicated signaling and is used for indicating the PRB that may be applied to the eCCH, the eCCH in the PRB indicated by the indication information that is sent by using dedicated signaling, and reads the MBMS in a PRB that is different from the foregoing PRB in the MBSFN subframe.

As can be seen, by using the method for identifying a physical resource block PRB according to this embodiment of the present invention, when an MBSFN subframe is multiplexed for an eCCH and an MBMS, when a base station receives indication information that is sent by an MCE and used for indicating usage of a PRB in the MBSFN subframe, the base station sends, to a served user terminal by using broadcast signaling and/or dedicated signaling, the indication information for indicating the usage of the PRB in the MBSFN subframe, so that the user terminal can properly decode the MBMS and eCCH.

Figure 10:
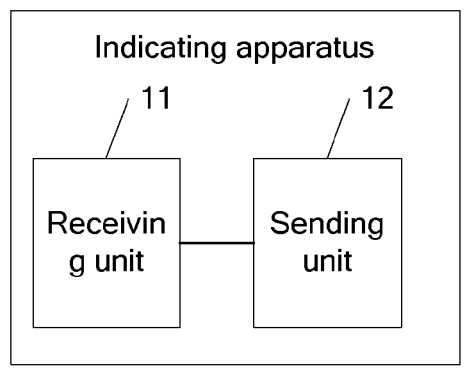
FIG. 10 is a schematic structural diagram of an apparatus for indicating a physical resource block PRB according to the present invention.

Referring to FIG. 10, an embodiment of the present invention provides an apparatus for indicating a physical resource block PRB, where the indicating apparatus includes a receiving unit 11, which is configured to receive indication information used for indicating usage of a PRB in an MBSFN subframe and a sending unit 12, which is configured to send the indication information for indicating the usage of the PRB in the MBSFN subframe to a served user terminal.

Specifically, the indication information that is received by the indicating apparatus by using the receiving unit 11 and used for indicating the usage of the PRB in the MBSFN subframe is notified by an MCE by using M2 interface signaling.

The indication information used for indicating the usage of the PRB in the MBSFN subframe includes indication information for indicating a PRB that is applied to an eCCH in the MBSFN subframe, where the indication information for indicating the PRB that is applied to the eCCH in the MBSFN subframe is used for indicating a quantity and/or position of the PRB that is applied to the eCCH in the MBSFN subframe; or indication information for indicating a PRB that is not applied to MBMS transmission in the MBSFN subframe, where the indication information for indicating the PRB that is not applied to MBMS transmission in the MBSFN subframe is used for indicating a quantity and/or position of the PRB that is not applied to MBMS transmission in the MBSFN subframe.

Specifically, when the receiving unit 11 receives the indication information used for indicating the usage of the PRB in the MBSFN subframe, the indicating apparatus sends the indication information for indicating the usage of the PRB in the MBSFN subframe to the served user terminal by using the sending unit 12. The sending unit 12 sends the indication information to the served user terminal by using broadcast signaling MCCH or SIB13, or sends the indication information to the served user terminal by using broadcast signaling MCCH or SIB13 and dedicated signaling, or sends the indication information to the served user terminal by using dedicated signaling.

Optionally, when the receiving unit 11 receives the indication information used for indicating the PRB that is applied to the eCCH in the MBSFN subframe, the sending unit 12 notifies, to the user terminal by using broadcast signaling MCCH or SIB13, the indication information for indicating the PRB that is applied to the eCCH in the MBSFN subframe, so that the user terminal reads, according to the MCCH or SIB13 information broadcast by the base station, an MBMS in a PRB that is different from the foregoing PRB in the MBSFN subframe. Meanwhile, the user terminal decodes, according to the information broadcast by the base station, the eCCH in the PRB that is applied to the eCCH in the MBSFN subframe.

Optionally, when the receiving unit 11 receives the indication information used for indicating the PRB that is not applied to MBMS transmission in the MBSFN subframe, the sending unit 12 sends, to the user terminal by using broadcast signaling MCCH or SIB13, the indication information for indicating the PRB that is not applied to MBMS transmission in the MBSFN subframe, so that the user terminal reads, according to the MCCH or SIB13 information broadcast by the base station, MBMS data in a PRB that is different from the foregoing PRB in the MBSFN subframe.

Optionally, when the receiving unit 11 receives the indication information used for indicating the PRB that is not applied to MBMS transmission in the MBSFN subframe, the sending unit 12 notifies, to the user terminal by using broadcast signaling MCCH or SIB13, the indication information for indicating the PRB that is not applied to MBMS transmission in the MBSFN subframe, so that the user terminal reads, according to the MCCH or SIB13 information broadcast by the base station, MBMS data in a PRB that is different from the foregoing PRB in the MBSFN subframe. Meanwhile, the sending unit 12 sends, to the user terminal by using dedicated signaling such as RRC signaling, the indication information for indicating the PRB that is applied to the eCCH in the MBSFN subframe, so that the user terminal reads the eCCH in the PRB indicated by the dedicated signaling.

Optionally, when the receiving unit 11 receives the indication information used for indicating the PRB that is not applied to MBMS transmission in the MBSFN subframe, the sending unit 12 may also directly send, to the user terminal by using dedicated signaling such as RRC, the indication information for indicating the PRB that is applied to the eCCH in the MBSFN subframe, so that the user terminal reads the eCCH in the PRB indicated by the dedicated signaling. Meanwhile, the user terminal reads the MBMS in a PRB that is different from the foregoing PRB in the MBSFN subframe.

It should be noted that, when the indication information that is received by the receiving unit 11 and used for indicating the PRB that is not applied to MBMS transmission in the MBSFN subframe indicates a PRB that may be applied to the eCCH, the sending unit 12 notifies, to the user terminal by using broadcast signaling MCCH or SIB13, indication information for indicating all the PRBs that may be applied to the eCCH in the MBSFN subframe, so that the user terminal reads the eCCH in the PRB indicated by the dedicated signaling. In addition, the user terminal reads MBMS data in a PRB that is different from the foregoing PRB in the MBSFN subframe. Meanwhile, the sending unit 12 sends, to the user terminal by using dedicated signaling such as RRC signaling, the indication information for indicating the PRB that is applied to the eCCH in the MBSFN subframe, so that the user terminal reads the eCCH in the PRB indicated by the dedicated signaling.

Optionally, when the indication information that is received by the receiving unit 11 and used for indicating the PRB that is not applied to MBMS transmission in the MBSFN subframe indicates the PRB that may be applied to the eCCH, the sending unit 12 may also directly notify, by using dedicated signaling such as RRC signaling, the user terminal of the indication information for indicating the PRB that is applied to the eCCH for the user terminal, so that the user terminal reads the eCCH in the PRB indicated by the dedicated signaling and reads MBMS data in a PRB that is different from the foregoing PRB in the MBSFN subframe.

As can be seen, by using the apparatus for indicating a physical resource block PRB according to this embodiment of the present invention, when an MBSFN subframe is multiplexed for an eCCH and an MBMS, when a base station receives indication information that is sent by an MCE and used for indicating usage of a PRB in the MBSFN subframe, the base station sends, to a served user terminal by using broadcast signaling and/or dedicated signaling, the indication information for indicating the usage of the PRB in the MBSFN subframe, so that the user terminal can properly decode the MBMS and eCCH.

Figure 11:
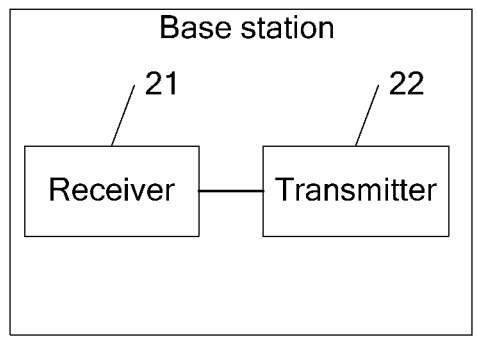
FIG. 11 is a schematic structural diagram of a base station according to the present invention.

Referring to FIG. 11, the present invention provides a base station, where the base station includes a receiver 21, which is configured to receive indication information that is sent by an MCE and used for indicating usage of a PRB in an MBSFN subframe and a transmitter 22, which is configured to send the indication information for indicating the usage of the PRB in the MBSFN subframe to a served user terminal.

Specifically, the base station receives, by using the receiver 21, the indication information for indicating the usage of the PRB in the MBSFN subframe, where the received indication information for indicating the usage of the PRB in the MBSFN subframe is notified by the MCE by using M2 interface signaling. The indication information for indicating the usage of the PRB in the MBSFN subframe includes indication information for indicating a PRB that is applied to an eCCH in the MBSFN subframe, where the indication information for indicating the PRB that is applied to the eCCH in the MBSFN subframe is used for indicating a quantity and/or position of the PRB that is applied to the eCCH in the MBSFN subframe; or indication information for indicating a PRB that is not applied to MBMS transmission in the MBSFN subframe, where the indication information for indicating the PRB that is not applied to MBMS transmission in the MBSFN subframe is used for indicating a quantity and/or position of the PRB that is not applied to MBMS transmission in the MBSFN subframe.

Specifically, when the receiver 21 receives the indication information used for indicating the usage of the PRB in the MBSFN subframe, the base station sends the indication information for indicating the usage of the PRB in the MBSFN subframe to the served user terminal by using the transmitter 22.

The transmitter 22 in this embodiment is specifically configured to send the indication information for indicating the usage of the PRB in the MBSFN subframe to the served user terminal by using broadcast signaling, such as a multimedia broadcast multicast service control channel MCCH, a system message, or dedicated signaling.

Figure 12:
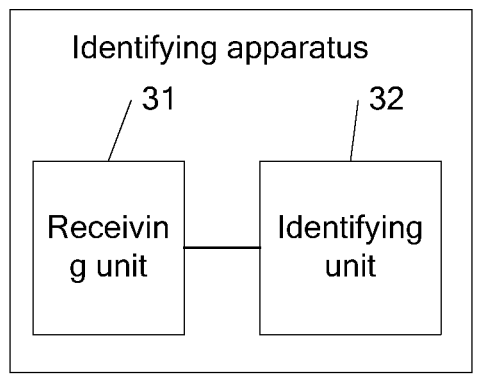
FIG. 12 is a schematic structural diagram of an apparatus for identifying a physical resource block PRB according to the present invention.

Referring to FIG. 12, the present invention provides an apparatus for identifying a physical resource block PRB, where the identifying apparatus includes a receiving unit 31, which is configured to receive indication information that is sent by an eNB and used for indicating usage of a PRB in an MBSFN subframe; and an identifying unit 32, which is configured to identify the indication information that is received by the receiving unit 31 and used for indicating the usage of the PRB in the MBSFN subframe, and identify the usage of each PRB in the MBSFN subframe.

Specifically, the indication information that is sent by the base station, received by the identifying apparatus by using the receiving unit 31, and used for indicating the usage of the PRB in the MBSFN subframe is notified by the base station by using broadcast signaling and/or dedicated signaling, where the indication information that is sent by the base station and used for indicating the usage of the PRB in the MBSFN subframe includes indication information for indicating a PRB that is applied to an eCCH in the MBSFN subframe, where the indication information for indicating the PRB that is applied to the eCCH in the MBSFN subframe is used for indicating a quantity and/or position of the PRB that is applied to the eCCH in the MBSFN subframe; or indication information for indicating a PRB that is not applied to MBMS transmission in the MBSFN subframe, where the indication information for indicating the PRB that is not applied to MBMS transmission in the MBSFN subframe is used for indicating a quantity and/or position of the PRB that is not applied to MBMS transmission in the MBSFN subframe.

Specifically, when the receiving unit 31 receives the indication information that is sent by the base station and used for indicating the usage of the PRB in the MBSFN subframe, the identifying apparatus identifies, by using the identifying unit 12, the indication information that is received by the receiving unit 31 and used for indicating the usage of the PRB in the MBSFN subframe, and identifies the usage of each PRB in the MBSFN subframe.

As can be seen, by using the apparatus for identifying a physical resource block PRB according to this embodiment of the present invention, when an MBSFN subframe is multiplexed for an eCCH and an MBMS, when a base station receives indication information that is sent by an MCE and used for indicating usage of a PRB in the MBSFN subframe, the base station sends, to a served user terminal by using broadcast signaling and/or dedicated signaling, the indication information for indicating the usage of the PRB in the MBSFN subframe, so that the user terminal can properly decode the MBMS and eCCH.

Figure 13:
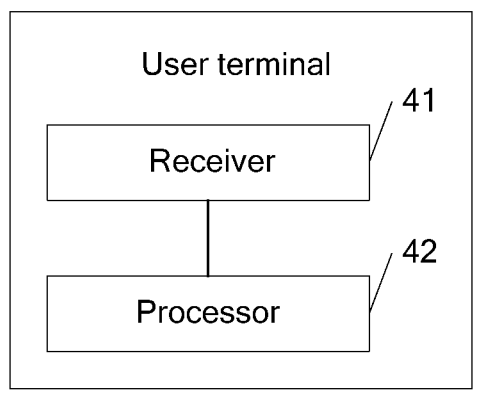
FIG. 13 is a schematic structural diagram of a user terminal according to the present invention.

Referring to FIG. 13, the present invention provides a user terminal, where the user terminal includes a receiver 41, which is configured to receive indication information that is sent by a base station and used for indicating usage of a PRB in an MBSFN subframe and a processor 42, which is configured to identify the usage of each PRB in the MBSFN subframe according to the indication information for indicating the usage of the PRB in the MBSFN subframe.

Specifically, the user terminal receives, by using the receiver 41, the indication information that is sent by the base station and used for indicating the usage of the PRB in the MBSFN subframe, where the indication information that is sent by the base station, received by the user terminal, and used for indicating the usage of the PRB in the MBSFN subframe is notified by the base station by using broadcast signaling and/or dedicated signaling. The indication information that is received by the receiver 41 and used for indicating the usage of the PRB in the MBSFN subframe includes indication information for indicating a physical resource block PRB that is applied to an enhanced control channel eCCH in the multimedia broadcast multicast service single frequency network MBSFN subframe or indication information for indicating a PRB that is not applied to multimedia broadcast multicast service MBMS transmission in the MBSFN subframe, where the indication information for indicating the PRB that is applied to the eCCH in the MBSFN subframe is used for indicating a quantity and/or position of the PRB that is applied to the eCCH in the MBSFN subframe and the indication information for indicating the PRB that is not applied to MBMS transmission in the MBSFN subframe is used for indicating a quantity and/or position of the PRB that is not applied to MBMS transmission in the MBSFN subframe.

Specifically, the user terminal receives, by using the receiver 41, the indication information that is sent by the base station and used for indicating the usage of the PRB in the MBSFN subframe, and processes, by using the processor 42, the received indication information that is used for indicating the usage of the PRB in the MBSFN subframe, so as to identify the usage of each PRB in the MBSFN subframe.

As can be seen, by using the user terminal according to this embodiment of the present invention, when an MBSFN subframe is multiplexed for an eCCH and an MBMS, when a base station receives indication information that is sent by an MCE and used for indicating usage of a PRB in the MBSFN subframe, the base station sends, to a served user terminal by using broadcast signaling and/or dedicated signaling, the indication information for indicating the usage of the PRB in the MBSFN subframe, so that the user terminal can properly decode the MBMS and eCCH.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A method for indicating a physical resource block PRB, comprising:
   receiving indication information that is sent by a multi-cell multicast coordination entity (MCE) and used to indicate usage of a physical resource block (PRB) in a multimedia broadcast multicast service single frequency network (MBSFN) subframe, wherein the MBSFN subframe is multiplexed for a multimedia broadcast multicast service (MBMS) transmission and another transmission that is not an MBMS transmission; and sending the indication information to a served user terminal;

wherein the indication comprises indication information for indicating a PRB that is applied to an enhanced control channel (eCCH) in the MBSFN subframe; and wherein the indication information is used for indicating a quantity and/or position of the PRB that is applied to the eCCH in the MBSFN subframe and wherein indication information for indicating the PRB that is not applied to MBMS transmission in the MBSFN subframe is used for indicating a quantity and/or position of the PRB that is not applied to MBMS transmission in the MBSFN subframe.

2. The method according to claim 1, wherein the indication information further comprises indication information for indicating a PRB that is not applied to MBMS transmission in the MBSFN subframe.

3. The method according to claim 1, wherein sending the indication information comprises sending the indication information to the served user terminal by using broadcast signaling.

4. The method according to claim 1, wherein sending the indication information comprises sending the indication information to the served user terminal by using broadcast signaling and dedicated signaling.

5. The method according to claim 1, wherein sending the indication information comprises sending the indication information to the served user terminal by using dedicated signaling.

6. A method for identifying a physical resource block (PRB), the method comprising:

receiving indication information that is sent by a base station and used for indicating usage of a PRB in a multimedia broadcast multicast service single frequency network (MBSFN) subframe, wherein the indication information indicates a PRB that is not applied to multimedia broadcast multicast service (MBMS) transmission in the MBSFN subframe; and identifying the usage of each PRB in the MBSFN subframe according to the received indication information;

wherein the indication information comprises indication information for indicating a PRB that is not applied to MBMS transmission in the MBSFN subframe, wherein the indication information for indicating the PRB that is not applied to MBMS transmission in the MBSFN subframe is used for indicating a quantity and/or position of the PRB that is not applied to MBMS transmission in the MBSFN subframe.

7. An apparatus for indicating a physical resource block (PRB), comprising:

a receiver, configured to receive indication information that is sent by a multi-cell multicast coordination entity (MCE) and used for indicating usage of a PRB in a multimedia broadcast multicast service single frequency network (MBSFN) subframe, wherein the MBSFN subframe is multiplexed for a multimedia broadcast multicast service (MBMS) transmission and another transmission that is not an MBMS transmission; and a transmitter, configured to send the indication information for indicating the usage of the PRB in the MBSFN subframe to a served user terminal;

wherein the indication information comprises indication information for indicating a PRB that is applied to an enhanced control channel eCCH in the MBSFN subframe, wherein the indication information for indicating the PRB that is applied to the eCCH in the MBSFN subframe is used for indicating a quantity and/or position of the PRB that is applied to the eCCH in the MBSFN subframe.

8. The indicating apparatus according to claim 7, wherein the transmitter is configured to send the indication information for indicating the usage of the PRB in the MBSFN subframe to the served user terminal by using a multimedia broadcast multicast service control channel (MCCH), a system message, or dedicated signaling.

9. The indicating apparatus according to claim 7, wherein the indicating apparatus comprises a base station.

10. The indicating apparatus according to claim 9, wherein the transmitter is configured to send the indication information for indicating the usage of the PRB in the MBSFN subframe to the served user terminal by using a multimedia broadcast multicast service control channel (MCCH), a system message, or dedicated signaling.

11. An apparatus for identifying a physical resource block (PRB), the apparatus comprising:

a receiver, configured to receive indication information that is sent by a base station and used for indicating usage of a PRB in a multimedia broadcast multicast service single frequency network (MBSFN) subframe, wherein the indication information indicates a PRB that is not applied to multimedia broadcast multicast service (MBMS) transmission in the MBSFN subframe; and a processor, configured to identify the usage of each PRB in the MBSFN subframe according to the indication information that is received by the receiver and used for indicating the usage of the PRB in the MBSFN subframe;

wherein the indication information that is sent by the base station comprises indication information for indicating a physical resource block PRB that is applied to an enhanced control channel eCCH in the MBSFN subframe, wherein the indication information for indicating the PRB that is applied to the eCCH in the MBSFN subframe is used for indicating a quantity and/or position of the PRB that is applied to the eCCH in the MBSFN subframe.

12. The apparatus according to claim 11, wherein the apparatus comprises a user terminal.

* * * * *